Sept. 2, 1930.  F. R. BOWMAN  1,774,960
FERTILIZER DISTRIBUTOR
Filed Dec. 13, 1926
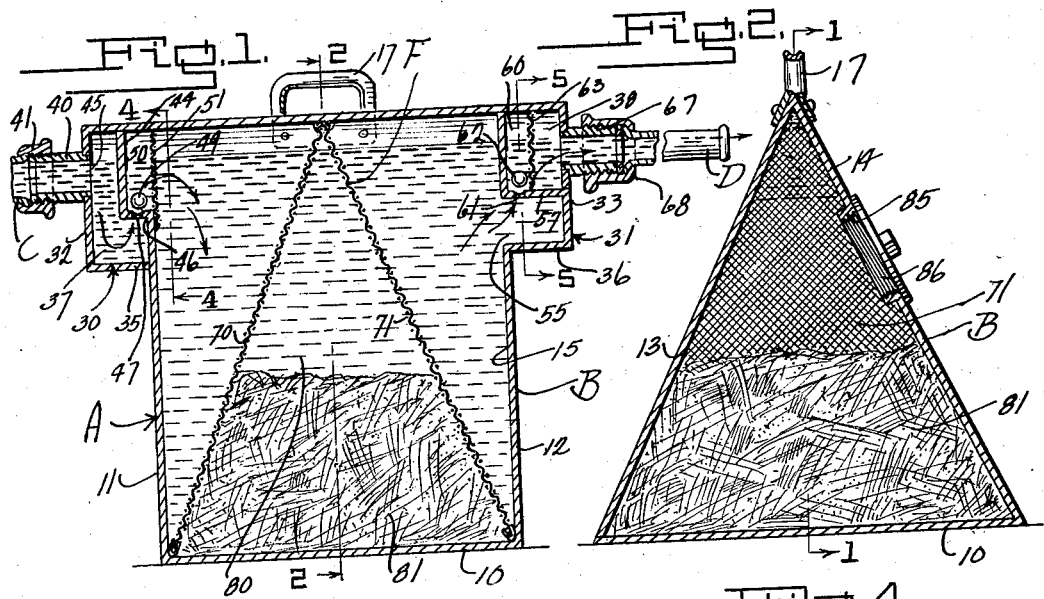
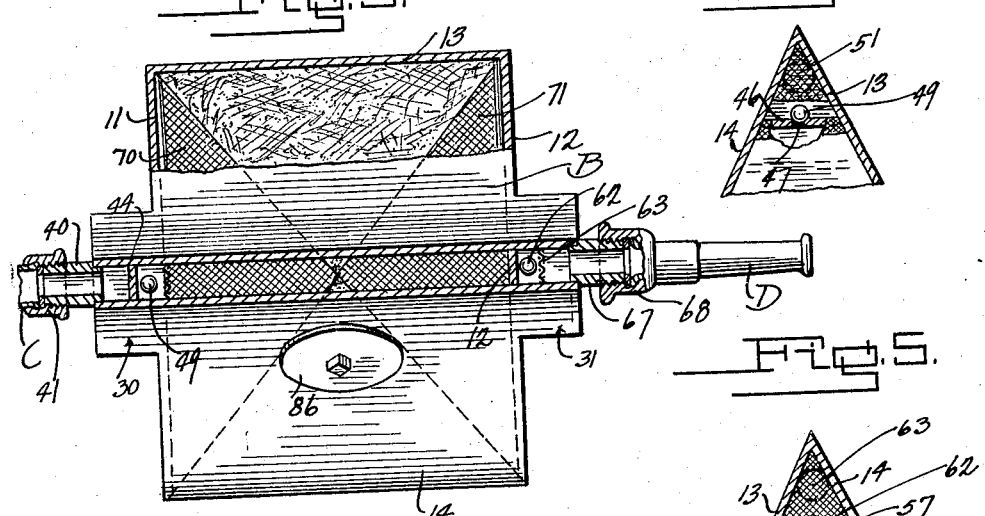
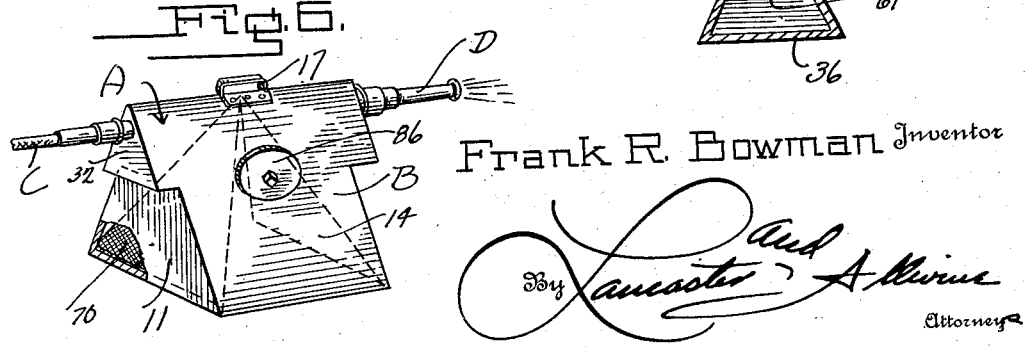
Frank R. Bowman, Inventor Patented Sept. 2, 1930

1,774,960

UNITED STATES PATENT OFFICE

FRANK R. BOWMAN, OF SALT LAKE CITY, UTAH

FERTILIZER DISTRIBUTOR

Application filed December 13, 1926. Serial No. 154,604.

This invention relates to improvements in means for distributing liquid fertilizer.

The primary object of this invention is the provision of an improved liquid fertilizer distributor, embodying novel means for permitting the feed of water into a fertilizing material, to insure an even percentage of solution of fertilizing material, without the use of moving parts or loss of efficiency.

A further object of this invention is the provision of an improved fertilizing container, adapted to be detachably hooked in an ordinary water conduit or hose, and wherein fertilizer is disposed in such relation that the water may pass from the hose into the fertilizing chamber and uniformly dissolve the fertilizing material, so long as the water flows thru the hose.

A further object of this invention is the provision of improved means adapted to be connected in a conventional hose or conduit line wherein water is carried, for the purpose of obtaining a constant percentage of solution of water and fertilizing material, at all pressures in the supply line.

Other objects and advantages of this invention will be apparent during the course of the following detailed description.

In the accompanying drawing, forming a part of this specification, and wherein similar reference characters designate corresponding parts throughout the several views, Figure 1 is a vertical sectional view taken thru the improved fertilizing distributor, in a vertical plane substantially on the line 1—1 of Figure 2.

Figure 2 is a vertical sectional view taken substantially on the line 2—2 of Figure 1, in a plane at right angles to the vertical plane of Figure 1.

Figure 3 is a fragmentary plan view of details of the improved fertilizing distributor.

Figures 4 and 5 are transverse sectional views taken substantially on their respective lines in Figure 1 of the drawing.

Figure 6 is a perspective view of the improved fertilizing distributor, showing the same connected in a hose or supply line and with a nozzle attached thereto.

In the drawing, wherein for the purpose of illustration is shown only a preferred embodiment of this invention, the letter A may generally designate the improved fertilizing distributor, which may comprise a housing B adapted to be detachably connected in a supply line C and having nozzle means D which may be part of the housing B, or part of the supply line C for ejection of the liquid fertilizer. Means F is provided in the housing B for maintaining the fertilizing material in such relation that a uniform and constant percentage of the same is taken up by water passing thru the housing B, at all times, independent of the rate of flow of water and the height of fertilizer in the housing B.

Referring to the housing B, the same includes a bottom 10, which may be of polygonal formation and at opposite sides thereof the same is provided with vertical walls 11 and 12. Since the upstanding wall structure of the housing B is preferably four-sided, the remaining side walls 13 and 14 are tapered upwardly in a converging relation from the bottom 10, and are suitably secured integral or welded, or soldered in a leakproof connection at their edges, with the other walls 11 and 12 above mentioned, to provide a compartment 15 thru which water is adapted to pass, as will be subsequently mentioned, to pick up the fertilizing material.

The vertical walls 11 and 12 are triangular in formation, as is best illustrated in Figure 6 of the drawing, due to the upwardly sloping walls 13 and 14. At the intersection of the walls 13 and 14, at the top of the housing B, the same is preferably provided with a handle 17, to facilitate the portability of the improved fertilizer distributor A, as can be readily understood.

At the top portions of the side walls 11 and 12, suitable liquid inlet and outlet control casings 30 and 31 are provided, which are formed by laterally extending the upper portions of the side walls 13 and 14, as illustrated in Figure 6. Vertical triangular shaped outer walls 32 and 33 respectively connect the lateral extensions of the side walls 13 and 14, and horizontal bottom walls 35 and 36 of the casings 30 and 31 respectively complete the casing extensions at the top of the side walls 11 and 12, to provide compartments 37 and 38 respectively therein, which receive certain valve means for controlling the inlet and outlet of water with respect to the housing compartment 15.

Referring to the casing 30, the wall 32 thereof is provided with a horizontal externally screw threaded nipple 40, which may be connected in a supply line C by means of a coupling 41 of conventional character. In the casing 30 a vertical partition wall 44 is provided, immediately facing the passageway 45 thru the nipple 40, against which the water engages as it enters the casing portion 30. The wall 44 terminates at its lower end above and in spaced relation with the wall 35, and there is connected with the main wall 11 of the housing B by means of a narrow horizontal wall 46, wherein an opening 47 is provided, and over which opening 47 a ball valve 49 is adapted to seat, in the nature of a check valve, and operating in a compartment 50 closed by a screen 51 from the main compartment 15 of the housing B. The ball valve 49 normally acts by gravity to close the opening 47, and operates in the space between the wall 44 and the screen 51, and incident to its seat in the opening 47 the same prevents back pressure of liquid in the supply line C and prevents the dissolving fertilizer to pass back into the supply line C during periods of idleness of the fertilizing distributor, when the same is filled with the liquid solution of fertilizer.

As to the casing portion 31 thru which the fertilizer charged water passes to the nozzle D, the wall 12 is provided with an opening 55 immediately above the wall 36, into the casing 31; and in spaced relation with the wall 36, a horizontal partition wall 57 is provided, spaced below the juncture of the side walls 13 and 14, to provide a compartment into which the charged water passes thru an opening 61 in the horizontal wall 57. In the compartment 60 is disposed a ball or other valve 62 operating on the opening 61, in the nature of a check valve.

A screen 63 may be disposed, in spaced relation with the facing wall 12, to screen the liquid before entering the nozzle D and also to guide the ball valve 62 in the path of movement. By gravity, the ball valve 62 drops to close the opening 61, and it opens incident to release of water from the compartment 15 to the nozzle D, but closes to prevent any back pressure from the nozzle D into the compartment of the housing B, as is readily obvious from Figure 1 of the drawing. The wall 33 is provided with an externally screw threaded discharge nipple 67 thereon, to which the nozzle D, or a hose line may be connected by means of a coupling 68, of conventional character.

Referring to the means F, the same is simple in character, and comprises substantially triangular shaped screens or perforated walls 70 and 71, resting at their lower ends on bottom wall 10, and tapering upwardly in converging relation. The walls 70 and 71 are respectively adjacent the walls 11 and 12, and the taper of the walls 70 and 71 respectively diverge with respect to the housing walls 11 and 12, as illustrated in Figure 1 of the drawing. The walls 70 and 71, or screens, as the case may be, are in engagement at their side edges with the converging side walls 13 and 14 of the housing B.

The compartment 80 between the perforated walls or screens 70 and 71 and the upwardly converging side walls 13 and 14 of the housing is adapted to receive the fertilizing material 81 as illustrated in the drawing, and it is to be noted that this compartment 80 is in the shape of a pyramid with its apex at the juncture of the upwardly converging side walls 13 and 14 of the housing B. In the side wall 14 a screw threaded opening 85 may be provided, as illustrated in Figure 2, wherein a manhole or cover 86 may detachably fit as a means of access to the opening 80 for cleaning and filling the same.

Under some circumstances where the volume of the pyramidal compartment 80 is to be varied, the screens or walls 70 and 71 may be made longitudinally adjustable.

Referring to the operation of the improved fertilizing distributor, the water of course passes from the supply line C thru the nipple 40 into the compartment 37, and there incident to force, lifts the ball valve 49 off its seat, and passes thru the screen 51 into the compartment 15. The fertilizer is piled in substantially pyramidal shape between the screen walls 70 and 71, and the water passes thru the screen walls 70 and 71, and thru the compartment 80 above the top of the fertilizer material 81, and the top surface facing the passing water is dissolved and carried thereby thru the discharge valve opening 61 and thru the nozzle D to the desired location. The fertilizing material 81 is of a nature which becomes more soluble when exposed to water for a period, that is, the same becomes more readily soluble the longer that it is exposed to the water. It is of a nature which will not permit the water to pass directly therethrough, but the water in order to discharge thru the fertilizer distributor must pass over the top surface of the fertilizer piled in the compartment 80 between the screens 70 and 71. The sides of the fertilizer 81 exposed on the screens 70 and 71 will not charge the water in the housing B to any great extent, but inasmuch as they do charge the water to a certain extent, this charge will always be constant, since while the sides of the fertilizer exposed directly on the screens 70 and 71 have a less area as the fertilizer is lowered, yet since the fertilizer is of a nature which becomes more soluble as it is exposed to the water for a longer period of time, the fact that the area exposed directly along the screens 70 and 71 becomes less is compensated, in so far as percentage of charge of water is concerned, by the fact that the fertilizer becomes more soluble as the period of time exposure increases. This fact is very important when it is considered that an absolutely constant percentage of charged fertilized water is necessary at all times, independent of the height of the fertilizer in the pyramidal compartment 80.

The water on entering the ingress opening passes thru the tank by way of the screens above the top level of fertilizer in the compartment 80. In passing thru the compartment 80 above the fertilizer the water of course occupies the entire space above the level of the fertilizer. Due to the obstructing screens or perforated walls 70 and 71, the action of the water is diffused, so that the water passes therethrough with equal rapidity in all parts of its volume. The fertilizer is dissolved and taken in solution by the water coming in contact with the top surface of the fertilizer. As the area of the vertical cross section of the space in the pyramidal compartment 80 above the top of the fertilizer is proportional to the area of the fertilizer top exposed between the screens 70 and 71, at any level of the fertilizer, the percentage of solution will be constant, that is, the rate of charge of the water will be constant, and will not vary.

Variation in the size of the pyramid 80 from given altitudes and spaced dimensions does not change the constancy of the solution for any particular size of pyramid. The percentage of charge for any particular size of pyramid is always the same, although by altering the altitude and base proportions the richness of the charge of one sized pyramidal space 80 may be changed with respect to the richness of the fertilizer charge of the liquid passing thru a pyramidal space 80 of another dimension. As an example, if a high percentage of solution, or a rich mixture of fertilizer in the water is desired, the altitude of the pyramidal space 80 is made small compared with the side dimensions of the base of the pyramidal space 80, so that in the specific example of a pyramidal space 80 having an altitude of 8″ with a base of 8″ square, the fertilizing charge of the water would be high and give a rich mixture. On the other hand if a low percentage of solution is desired, that is a lean mixture of fertilizer in the water is desired, the altitude may be made relatively great compared to the side dimensions of the base, and in an instance such as the pyramid having an altitude of 30″ with a base square of 6″, the proportion of fertilizer to the quantity of water in which it is mixed would be small, and a lean charge of fertilizer in the water would result.

In either of the specific examples above given the percentage of charge of the water would be the same from the time the fertilizer started to dissolve in the water, until the fertilizer had reached the base of the pyramid space 80.

From the foregoing description of this invention it is apparent that a novel fertilizing distributor has been provided, of a simple nature, which may be economically manufactured to efficiently charge a flow of water with fertilizer, in a constant manner, according to a desired percentage of charge.

The actual fertilizing material used does not necessarily have to be an actual chemical solution in the water, since in addition to some of the fertilizer in solution in the water with certain powdered fertilizers some of the fertilizer will be carried in suspension in the water, but this feature does not in any way change the relative proportion of fertilizer with respect to the water during the operation of the device.

Various changes in the shape, size, and arrangement of parts may be made to the apparatus herein shown and described, as well as the use of various fertilizing materials may be employed, in various proportions, without departing from the spirit of the invention, or the scope of the claims.

I claim:

1. In a fertilizer distributor the combination of a housing including a bottom wall, oppositely disposed upwardly converging walls connected at opposite sides of the bottom and being connected at their upper edges, substantially vertically disposed side walls having marginal connection with the upwardly extending convergent walls above mentioned being connected at their lower margins with the bottom to define a compartment in the housing, an inlet connection at the top of one of said substanially vertically disposed side walls, an outlet connection at the top of the other substantially vertical disposed wall, substantially triangular shaped perforated walls in the compartment of the housing in facing relation with the substantially vertically disposed side walls above mentioned relatively converging upwardly from the bottom to the top connection of the upwardly converging walls of the housing first mentioned, said perforated walls and the upwardly converging walls of the housing first mentioned providing a substantially pyramidal shaped compartment therein adapted to receive a soluble fertilizer, and means for admitting the fertilizer to said pyramidal shaped compartment.

2. In a fertilizer distributor the combination of a housing including a base supporting wall, oppositely disposed upwardly converging walls connected with the base wall, other side walls connected with the base and together with the converging walls providing a compartment in the housing, inlet and outlet openings at opposite sides of the housing between said converging walls by means of which water may be forced through the housing parallel between said converging walls, and upwardly converging screen walls extending from the base and arranged transverse to the converging walls and each obstructing the housing compartment completely between said converging walls to provide with said converging walls a pyramidal shaped space adapted to receive a fertilizer.

3. In a fertilizer distributor the combination of a structure including oppositely disposed imperforate upwardly convergent walls and other oppositely disposed perforated upwardly convergent walls connected with the first mentioned walls and together therewith forming an upwardly tapering compartment, housing means associated with said walls at the outer sides of the perforated walls providing otherwise closed compartments facing said perforated walls throughout the height thereof and relatively shut off from each other except through the perforated walls, and inlet and outlet means arranged on the housing means at the outer sides of the perforated walls, by means of which water may be forced through the compartments parallel between the imperforate convergent walls and through the perforated walls in a horizontal course at a location near the upper part of the tapered compartment between the said convergent walls.

FRANK R. BOWMAN.